United States Patent
Kang et al.

(10) Patent No.: US 10,277,287 B2
(45) Date of Patent: Apr. 30, 2019

(54) ANTENNA SYSTEM AND HARMONIC SUPPRESSION ELEMENT

(71) Applicant: MediaTek Inc., Hsin-Chu (TW)

(72) Inventors: Ting-Wei Kang, Kaohsiung (TW); Shih-Huang Yeh, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 548 days.

(21) Appl. No.: 14/936,976

(22) Filed: Nov. 10, 2015

(65) Prior Publication Data

US 2016/0323053 A1    Nov. 3, 2016

Related U.S. Application Data

(60) Provisional application No. 62/154,356, filed on Apr. 29, 2015.

(51) Int. Cl.
| | |
|---|---|
| H04B 1/18 | (2006.01) |
| H04B 1/44 | (2006.01) |
| H04B 7/04 | (2017.01) |
| H04B 1/04 | (2006.01) |
| H01Q 21/28 | (2006.01) |
| H01Q 5/314 | (2015.01) |
| H01Q 5/335 | (2015.01) |

(52) U.S. Cl.
CPC ............ *H04B 7/04* (2013.01); *H01Q 5/314* (2015.01); *H01Q 5/335* (2015.01); *H01Q 21/28* (2013.01); *H04B 1/0458* (2013.01)

(58) Field of Classification Search
CPC .......... H04B 1/38; H04B 1/0458; H04B 1/04; H04B 1/16; H04B 1/18; H04B 1/40; H04B 1/44; H04B 1/46; H04B 1/56
See application file for complete search history.

(56) References Cited

U.S. PATENT DOCUMENTS

| | | | |
|---|---|---|---|
| 7,917,096 B2 * | 3/2011 | Wilcox | H04B 1/18 333/124 |
| 8,620,236 B2 | 12/2013 | Manssen et al. | |
| 9,209,849 B2 | 12/2015 | Kim et al. | |
| 2009/0284433 A1 | 11/2009 | Tsutsumi et al. | |
| 2010/0091752 A1 * | 4/2010 | Kemmochi | H03H 7/09 370/339 |
| 2010/0157858 A1 * | 6/2010 | Lee | H01Q 9/40 370/297 |
| 2010/0309901 A1 * | 12/2010 | Beghini | H04B 1/0057 370/343 |
| 2013/0127674 A1 | 5/2013 | Korva | |

(Continued)

FOREIGN PATENT DOCUMENTS

| | | |
|---|---|---|
| CN | 101663825 A | 3/2010 |
| CN | 101917219 A | 12/2010 |

(Continued)

Primary Examiner — Blane J Jackson
(74) Attorney, Agent, or Firm — McClure, Qualey & Rodack, LLP

(57) ABSTRACT

An antenna system includes an antenna, a first frequency dividing circuit, a second frequency dividing circuit, and a plurality of matching circuits. The first frequency dividing circuit is coupled to the antenna. The matching circuits are coupled to the first frequency dividing circuit. The second frequency dividing circuit is coupled to the matching circuits. The matching circuits are configured to process different frequency signals, respectively.

42 Claims, 13 Drawing Sheets

(56) References Cited

U.S. PATENT DOCUMENTS

| | | | |
|---|---|---|---|
| 2013/0285873 A1 | 10/2013 | Dupuy et al. | |
| 2014/0104128 A1 | 4/2014 | Pu et al. | |
| 2015/0123874 A1 | 5/2015 | Chan et al. | |
| 2016/0142083 A1 | 5/2016 | Kim et al. | |
| 2016/0285505 A1* | 9/2016 | Lee | H04B 1/62 |
| 2017/0332280 A1* | 11/2017 | Kuroda | H04W 28/16 |

FOREIGN PATENT DOCUMENTS

| | | |
|---|---|---|
| CN | 201663237 U | 12/2010 |
| CN | 102739265 A | 10/2012 |

* cited by examiner

ANTENNA SYSTEM AND HARMONIC SUPPRESSION ELEMENT

CROSS REFERENCE TO RELATED APPLICATIONS

This application claims the benefit of U.S. Provisional Application No. 62/154,356, filed on Apr. 29, 2015, the entirety of which is incorporated by reference herein.

BACKGROUND OF THE INVENTION

Field of the Invention

The disclosure generally relates to an antenna system, and more particularly, to an antenna system with a harmonic suppression element.

Description of the Related Art

To meet LTE-A (Long Term Evolution -Advance) requirements, support of transmission bandwidths that are wider than the 20 MHz bandwidth specified in 3GPP (3rd Generation Partnership Project) Release 8/9 is required. The preferred solution to this is carrier aggregation, which is one of the most distinctive features of 4G LTE-A. Carrier aggregation allows the expansion of effective bandwidth delivered to a user terminal through concurrent utilization of radio resources across multiple carriers. Multiple component carriers are aggregated to form a larger overall transmission bandwidth.

However, the technology of carrier aggregation requires multiple frequency ranges and a wide frequency range width. It has become a critical challenge for engineers to design such an antenna system to meet the requirements of carrier aggregation.

BRIEF SUMMARY OF THE INVENTION

In one aspect, an antenna system is disclosed including an antenna, a first frequency dividing circuit, a second frequency dividing circuit, and a plurality of matching circuits. The first frequency dividing circuit is coupled to the antenna. The matching circuits are coupled to the first frequency dividing circuit. The second frequency dividing circuit is coupled to the matching circuits. The matching circuits are configured to process different frequency signals, respectively.

In some embodiments, when the first frequency dividing circuit receives a frequency range from the first antenna, the first frequency dividing circuit divides the frequency range into a plurality of frequency sub-ranges, and outputs at least two of the frequency sub-ranges respectively to the matching circuits.

In some embodiments, when the first frequency dividing circuit receives one or more frequency sub-ranges respectively from one or more of the matching circuits, the first frequency dividing circuit outputs the one or more received frequency sub-ranges to the first antenna.

In some embodiments, the first frequency dividing circuit includes a first port coupled to the first antenna, a plurality of second ports respectively coupled to the matching circuits, and a plurality of signal paths coupled between the first port and the second ports. The signal paths are configured to pass a plurality of frequency sub-ranges from the first port to the second ports respectively, or respectively from the second ports to the first port.

In some embodiments, when the second frequency dividing circuit receives a frequency range from an RF (Radio Frequency) module, the second frequency dividing circuit divides the frequency range into a plurality of frequency sub-ranges, and outputs at least two of the frequency sub-ranges respectively to the matching circuits.

In some embodiments, when the second frequency dividing circuit receives one or more frequency sub-ranges from one or more of the matching circuits, the second frequency dividing circuit outputs at least one of the one or more received frequency sub-ranges to the RF module.

In some embodiments, the second frequency dividing circuit includes a first port coupled to an RF module, a plurality of second ports respectively coupled to the matching circuits, and a plurality of signal paths coupled between the first port and the second ports. The signal paths are configured to pass a plurality of frequency sub-ranges from the first port to the second ports respectively, or respectively from the second ports to the first port.

The antenna system further includes a first RF (Radio Frequency) module. The first RF module is coupled to the second frequency dividing circuit.

In some embodiments, the second frequency dividing circuit has a first frequency terminal coupled to a first matching circuit of the matching circuits, a second frequency terminal coupled to a second matching circuit of the matching circuits, and a combined frequency terminal coupled to the first RF module.

In some embodiments, the second frequency dividing circuit includes a low-pass signal path and a high-pass signal path, the low-pass signal path is coupled between the first frequency terminal and the combined frequency terminal of the second frequency dividing circuit, and the high-pass signal path is coupled between the second frequency terminal and the combined frequency terminal of the second frequency dividing circuit.

In some embodiments, the first frequency dividing circuit is a diplexer.

In some embodiments, the diplexer has a first frequency terminal coupled to a first matching circuit of the matching circuits, a second frequency terminal coupled to the second matching circuit of the matching circuits, and a combined frequency terminal coupled to the first antenna.

In some embodiments, the diplexer includes a low-pass signal path and a high-pass signal path, the low-pass signal path is coupled between the first frequency terminal and the combined frequency terminal of the diplexer, and the high-pass signal path is coupled between the second frequency terminal and the combined frequency terminal of the diplexer.

In some embodiments, the combined frequency terminal of the diplexer is coupled to a single feeding point on the first antenna.

In some embodiments, the first frequency dividing circuit includes a first filter and a second filter.

In some embodiments, a first matching circuit of the matching circuit is coupled through the first filter to a first feeding point on the first antenna, and a second matching circuit of the matching circuits is coupled through the second filter to a second feeding point on the first antenna.

In some embodiments, the first filter is a low-pass filter, and the second filter is a high-pass filter.

In some embodiments, the antenna system further includes a second antenna and a second RF (Radio Frequency) module. The second RF module is coupled to a single feeding point on the second antenna.

In some embodiments, each of the matching circuits includes a respective tunable network with a respective impedance value.

In some embodiments, the antenna system further includes a coupler and a processor. The coupler is coupled between the second frequency dividing circuit and the first RF module. The processor receives communication information through the coupler from the first antenna, and generates a control signal according to the communication information. Respective impedance values of the matching circuits are adjusted according to the control signal.

In some embodiments, at least one of the first frequency dividing circuit and the second frequency dividing circuit is a passive element.

In some embodiments, at least one of the first frequency dividing circuit and the second frequency dividing circuit is an active element.

In some embodiments, a respective range of at least one of the frequency sub-ranges output by the first frequency dividing circuit is dynamically changed.

In some embodiments, a respective range of at least one of the frequency sub-ranges output by the second frequency dividing circuit is dynamically changed.

In some embodiments, each of the first frequency dividing circuit and the second frequency dividing circuit includes a low-pass filter, a high-pass filter, a band-pass filter, a diplexer, duplexer, tri-plexer, quad-plexer, or a combination thereof.

In some embodiments, at least one of the matching circuits includes a first terminal, a second terminal, a plurality of loading elements, and a switch element. The first terminal is coupled to the first frequency dividing circuit. The second terminal is coupled to the second frequency dividing circuit. The loading elements are coupled to one of the first terminal and the second terminal, and having different impedances. The switch element is coupled to the other one of the first terminal and the second terminal, and it switches between the loading elements.

In some embodiments, at least one of the loading elements includes one or more inductors, one or more variable capacitors, one or more fixed capacitors, or a combination thereof.

In some embodiments, at least one of the matching circuits includes a tuner. The tuner is coupled between the first frequency dividing circuit and the second frequency dividing circuit, and it generates different impedance values.

In a preferred embodiment, the invention is directed to a harmonic suppression element including a first frequency dividing circuit, a first matching circuit, a second matching circuit, and a second frequency dividing circuit. The first matching circuit is coupled to the first frequency dividing circuit. The second matching circuit is coupled to the first frequency dividing circuit. The second frequency dividing circuit is coupled to the first matching circuit and the second matching circuit. The first matching circuit and the second matching circuit are configured to process different frequency signals, respectively.

In a preferred embodiment, the invention is directed to an electronic device including an antenna, a first frequency dividing circuit, a second frequency dividing circuit, a plurality of matching circuits, and an RF (Radio Frequency) module. The first frequency dividing circuit is coupled to the antenna. The matching circuits are coupled to the first frequency dividing circuit. The second frequency dividing circuit is coupled to the matching circuits. The RF module is coupled to the second frequency dividing circuit. The matching circuits are configured to process different frequency signals, respectively.

In another aspect, an antenna system is disclosed including an antenna and a frequency selection element. When the frequency selection element receives a first frequency range from the antenna, the frequency selection element divides the first frequency range into a plurality of first frequency sub-ranges, passes at least one of the first frequency sub-ranges through at least one of a plurality of first signal paths, respectively, tunes the at least one first frequency sub-range, and outputs the at least one first frequency sub-range to an RF module. When the frequency selection element receives a second frequency range from the RF module, the frequency selection element divides the second frequency range into a plurality of second frequency sub-ranges, passes at least one of the second frequency sub-ranges through at least one of a plurality of second signal paths, respectively, tunes the at least one second frequency sub-range, and outputs the at least one second frequency sub-range to the antenna.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

In order to illustrate the purposes, features and advantages of the invention, the embodiments and figures of the invention will be described in detail as follows.

Figure 1:
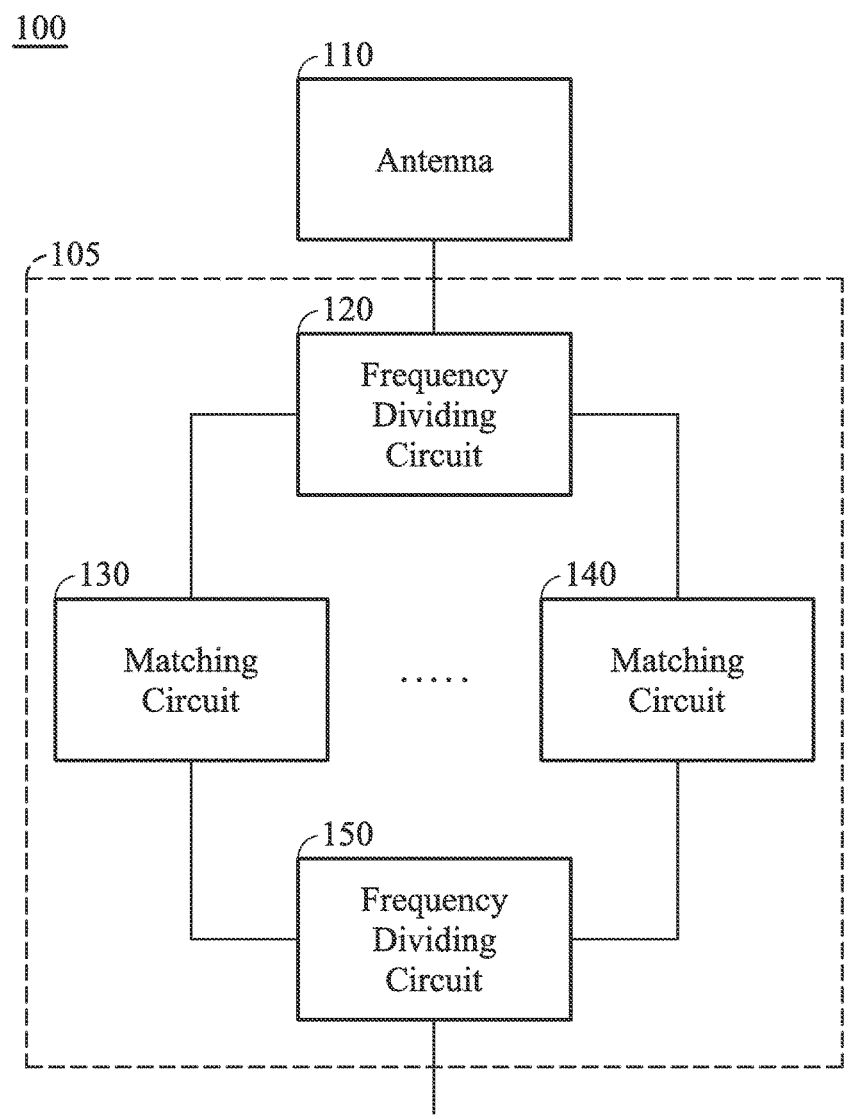
FIG. 1 is a diagram of an antenna system according to an embodiment of the invention.

FIG. 1 is a diagram of an antenna system 100 according to an embodiment of the invention. For example, the antenna system 100 may be applied in a communication device, such as a smartphone, a tablet computer, or a notebook computer.

The antenna system 100 can support the technology of carrier aggregation in the field of LTE-A (Long Term Evolution -Advance). As shown in FIG. 1, the antenna system 100 includes an antenna 110, a first frequency dividing circuit 120, a plurality of matching circuits as exemplarily shown two matching circuits 130 and 140 but not limited thereto, and a second frequency dividing circuit 150. The antenna 110 may be a monopole antenna, a dipole antenna, a loop antenna, a helical antenna, or a chip antenna, but it is not limited thereto. The first frequency dividing circuit 120 is coupled to the antenna 110. The matching circuits 130 and 140 are coupled to the first frequency dividing circuit 120. Each of the matching circuits 130 and 140 can provide a respective variable impedance value switched between different respective impedance values. The second frequency dividing circuit 150 is coupled to the matching circuits 130 and 140. The matching circuits 130 and 140 are configured to process different frequency signals (e.g., pertaining to different frequency sub-ranges), respectively. The first frequency dividing circuit 120, the matching circuits 130 and 140, and the second frequency dividing circuit 150 can collectively form a frequency selection element 105 for frequency division and combination.

Generally speaking, the antenna 110 operates in multiple frequency ranges or sub-ranges by using the first frequency dividing circuit 120, the second frequency dividing circuit 150, and the matching circuits 130 and 140. Each of the first frequency dividing circuit 120 and the frequency dividing circuit 150 can divide a received frequency range into a plurality of frequency sub-ranges or components and outputting them separately, preventing different frequency sub-ranges or components to interference with each other, thus allowing the antenna 110 to switch between the different respective impedance values of a corresponding one of the matching circuits 130 and 140 in at least one of the frequency sub-range or components independently from the other frequency sub-ranges or components. In addition, the first frequency dividing circuit 120 and the second frequency dividing circuit 150 can be configured to suppress harmonic interference in the antenna system 100. Please refer to the following embodiments for detailed descriptions.

In some embodiments, when the first frequency dividing circuit 120 receives a frequency range from the antenna 110, the first frequency dividing circuit 120 divides the frequency range into a plurality of frequency sub-ranges or components, and outputs at least two of the frequency sub-ranges or components respectively to the matching circuits 130 and 140. In the same or other embodiments, when the first frequency dividing circuit 120 receives one or more frequency sub-ranges or components respectively from one or more of the matching circuits 130 and 140, the first frequency dividing circuit 120 outputs the one or more received frequency sub-range or components to the antenna 110. For example, the first frequency dividing circuit 120 outputs a signal including both the low and high frequency sub-ranges or components to the antenna 110.

Specifically, in some embodiments, the first frequency dividing circuit 120 has a first port coupled to the antenna 110, a plurality of second ports respectively coupled to the matching circuits 130 and 140, and a plurality of signal paths coupled between the first port and the second ports. The signal paths of the first frequency dividing circuit 120 are configured to pass a plurality of frequency sub-range or components from the first port to the second ports respectively, or respectively from the second ports to the first port.

Similarly, in some embodiments, when the second frequency dividing circuit 150 receives a frequency range from a RF (Radio Frequency) module (not shown), the second frequency dividing circuit 150 divides the frequency range into a plurality of frequency sub-ranges or components, and outputs at least two of the frequency sub-ranges or components respectively to the matching circuits 130 and 140. In the same or other embodiments, wherein when the second frequency dividing circuit 150 receives one or more frequency sub-ranges or components from one or more of the matching circuits 130 and 140, the second frequency dividing circuit outputs at least one of the one or more received frequency sub-ranges or components to the RF module. For example, the second frequency dividing circuit 150 outputs a signal including both the low and high frequency sub-ranges or components to the RF module.

Specifically, in some embodiments, the second frequency dividing circuit 250 has a first port coupled to the RF module, a plurality of second ports respectively coupled to the matching circuits 130 and 140, and a plurality of signal paths coupled between the first port and the second ports. The signal paths of the second frequency dividing circuit 250 are configured to pass a plurality of frequency sub-ranges or components from the first port to the second ports respectively, or respectively from the second ports to the first port.

Figure 2:
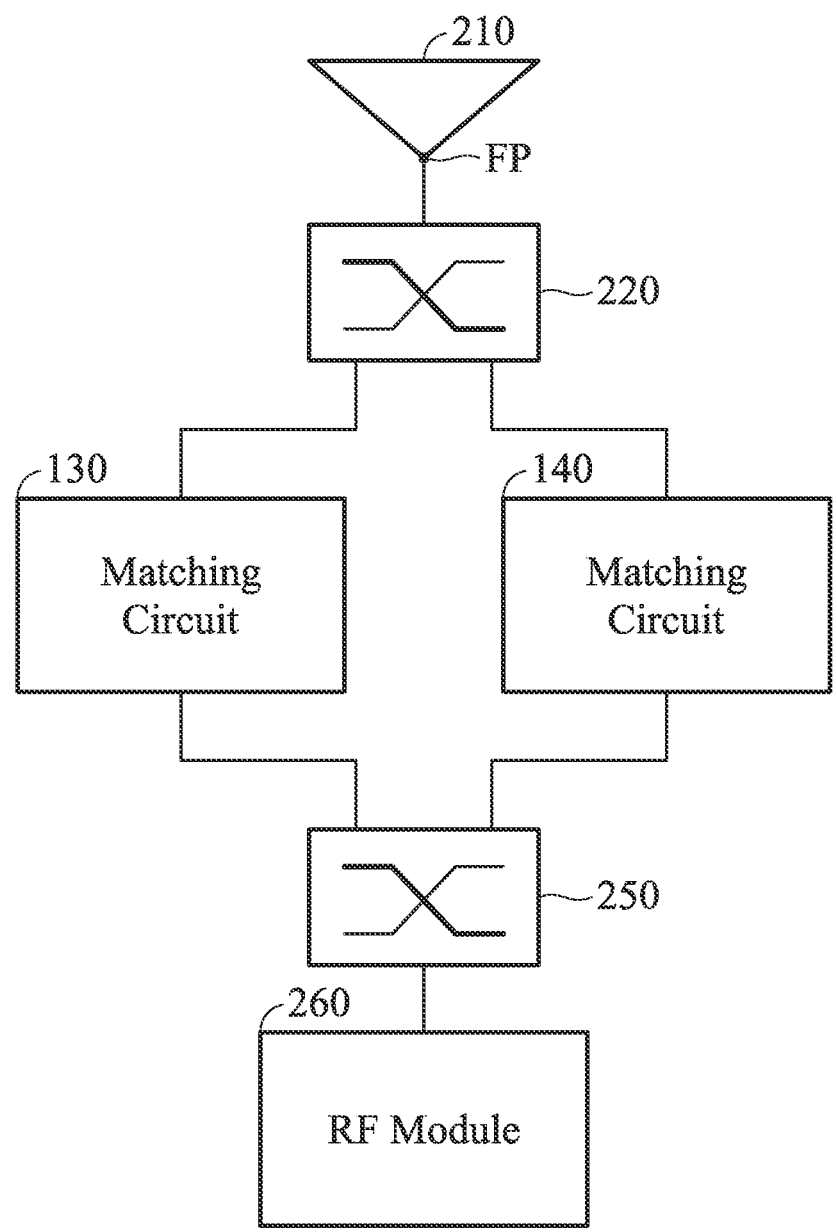
FIG. 2 is a diagram of an antenna system according to an embodiment of the invention.

FIG. 2 is a diagram of an antenna system 200 according to an embodiment of the invention. FIG. 2 is similar to FIG. 1, illustrating more details of frequency dividing circuits for explaining the operation of the antenna system. In the embodiment of FIG. 2, the antenna system 200 includes an antenna 210, a first frequency dividing circuit 220, a plurality of matching circuits 130 and 140, a second frequency dividing circuit 250, and an RF (Radio Frequency) module 260. The RF module 260 may be a transceiver for transmitting and receiving RF signals In some embodiments, at least one of the first frequency dividing circuit 220 and the second frequency dividing circuit 250 is a passive element. In alternative embodiments, at least one of the first frequency dividing circuit 220 and the second frequency dividing circuit 250 is an active element. In some embodiments, a range of the frequency sub-range or component respectively output by the first frequency dividing circuit 220 is fixed. In some other embodiments, a respective range of at least one of the frequency sub-ranges or components output by the first frequency dividing circuit 220 is dynamically changed. In some embodiments, a range of the frequency sub-range or component respectively output by the second frequency dividing circuit 250 is fixed. In some embodiments, a respective range of at least one of the frequency sub-ranges or components output by the second frequency dividing circuit 250 is dynamically changed. In some embodiments, each of the first frequency dividing circuit 220 and the second frequency dividing circuit 250 includes a low-pass filter, a high-pass filter, a band-pass filter, a diplexer, duplexer, tri-plexer, quad-plexer, or a combination thereof. In some embodiments, one or more RF (Radio Frequency) carkit points (not shown) for testing the device are disposed at any position on the antenna system 200.

In the embodiment of FIG. 2, each of the first frequency dividing circuit 220 and the second frequency dividing circuit 250 is a diplexer. Please refer to FIG. 3A and FIG. 3B to understand their detailed structures.

The RF module 260 can act as a transceiver. In a first situation, when the RF module acts as a receiver, it means that a signal is transmitted from the antenna 210, through the diplexer 220, the matching circuit 130 and 140, and the diplexer 250, to the RF module 260. In detail, the signal is provided by the antenna 210 to the diplexer 220, which divides the signal into two frequency ranges or sub-ranges (e.g., a low frequency sub-range and a high frequency sub-range), transmits the low frequency sub-range and the high frequency sub-range via two different signal paths to generate two output signals, and provides the two output signals separately to the matching circuits 130 and 140. The output signal pertaining to the low frequency sub-range is processed in the matching circuit 130, generating a first processed signal and the output signal pertaining to the high frequency sub-range is processed in the matching circuit 140, generating a second processed signal. The first and second processed signals are then input to the diplexer 250, which, similar to the diplexer 220, allowing at least one of the first and second processed signal to reach the RF module 260. For example, the diplexer 250 can output a signal including both the high and low sub-ranges to the RF module 260.

In this way, the low frequency sub-range and the high frequency sub-range in the signal transmitted by the antenna 210 can be separated into different signal paths without tending to interfere with each other and eventually provided to the RF module 260. Accordingly, the antenna 210 can switch between the different respective impedance values of the variable impedance circuit 130 in the low frequency sub-range or component independently from the high frequency sub-range or component, and can switch between the different respective impedance values of the variable impedance circuit 140 in the high frequency sub-range or component independently from the low frequency sub-range or component.

In a second situation when the RF module acts as a transmitter, it means that a signal is transmitted from the RF module 260, through the diplexer 250, the matching circuit 130 and 140, and the diplexer 220, to the antenna 210. In detail, the signal is provided by the RF module 260 to the diplexer 250, which divides the signal into a low frequency sub-range and a high frequency sub-range, transmits the low frequency sub-range and the high frequency sub-range via two different signal paths to generate two output signals, and provides the two output signals separately to the matching circuits 130 and 140. The output signal pertaining to the low frequency sub-range is processed in the matching circuit 130, generating a first processed signal and the output signal pertaining to the high frequency sub-range is processed in the matching circuit 140, generating a second processed signal. The first and second processed signals are then input to the diplexer 220, which, similar to the diplexer 250, allowing at least one of the first and second processed signal to reach the RF module 260. For example, the diplexer 220 can output a signal including both the high and low sub-ranges to the antenna 210.

In this way, the low frequency sub-range and the high frequency sub-range in the signal transmitted by the RF module 260 can be separated into different signal paths without tending to interfere with each other and provided to the antenna 210. Accordingly, the antenna 210 can switch between the different respective impedance values of the variable impedance circuit 130 in the low frequency sub-range or component independently from the high frequency sub-range or component, and can switch between the different respective impedance values of the variable impedance circuit 140 in the high frequency sub-range or component independently from the low frequency sub-range or component.

Figure 3A:
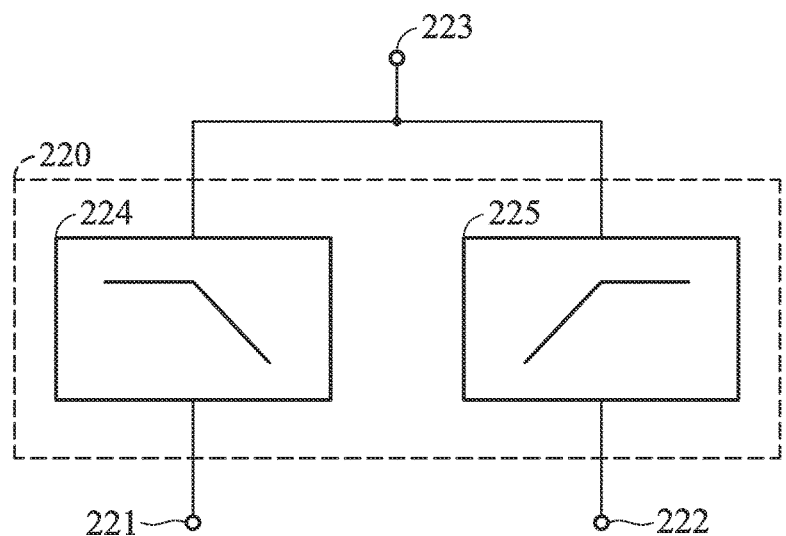
FIG. 3A is a diagram of a first frequency dividing circuit according to an embodiment of the invention.

FIG. 3A is a diagram of the first frequency dividing circuit 220 according to an embodiment of the invention. The first frequency dividing circuit 220 (diplexer) has a first frequency terminal 221 coupled to the matching circuit 130, a second frequency terminal 222 coupled to the matching circuit 140, and a combined frequency terminal 223 coupled to the antenna 210. For example, the combined frequency terminal 223 of the first frequency dividing circuit 220 may be coupled to a single feeding point FP of the antenna 210. The first frequency dividing circuit 220 (diplexer) can include a low-pass signal path 224 and a high-pass signal path 225. The low-pass signal path 224 is configured to pass low-frequency signals and block high-frequency signals. The high-pass signal path 225 is configured to pass high-frequency signals and block low-frequency signals. The low-pass signal path 224 is coupled between the first frequency terminal 221 and the combined frequency terminal 223 of the first frequency dividing circuit 220. The high-pass signal path 225 is coupled between the second frequency terminal 222 and the combined frequency terminal 223 of the first frequency dividing circuit 220. In alternative embodiments, the low-pass signal path 224 may be interchangeable with the high-pass signal path 225. With such implementations, the high frequency sub-range and the low frequency sub-range can be separated into different signal paths without tending to interfere with each other.

Figure 3B:
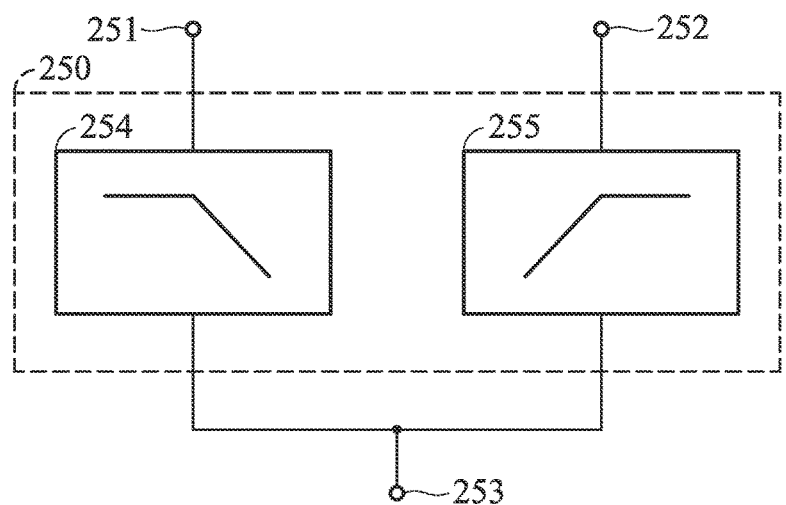
FIG. 3B is a diagram of a second frequency dividing circuit according to an embodiment of the invention.

FIG. 3B is a diagram of the second frequency dividing circuit 250 according to an embodiment of the invention. The second frequency dividing circuit (diplexer) 250 has a first frequency terminal 251 coupled to the matching circuit 130, a second frequency terminal 252 coupled to the matching circuit 140, and a combined frequency terminal 253 coupled to the RF module 260. The second frequency dividing circuit (diplexer) 250 includes a low-pass signal path 254 and a high-pass signal path 255. The low-pass signal path 254 is configured to pass low-frequency signals and block high-frequency signals. The high-pass signal path 255 is configured to pass high-frequency signals and block low-frequency signals. The low-pass signal path 254 is coupled between the first frequency terminal 251 and the combined frequency terminal 253 of the second frequency dividing circuit 250. The high-pass signal path 255 is coupled between the second frequency terminal 252 and the combined frequency terminal 253 of the second frequency dividing circuit 250. In alternative embodiments, the low-pass signal path 254 may be interchangeable with the high-pass signal path 255. With such implementations, the high frequency sub-range and the low frequency sub-range can be separated into different signal paths without tending to interfere with each other.

Retuning to refer to FIG. 2 for more details of the operation of the antenna system 200 and circuits thereof. Each of the matching circuits 130 and 140 may include one or more inductive and/or capacitive elements, and it can provide a fixed or variable impedance value. In the embodiment of FIG. 2, the matching circuit 130 is configured to process low-frequency signals, and the matching circuit 140 is configured to process high-frequency signals for example. When low-frequency signals are received by the antenna 210 to be transmitted to the RF module 260 or generated by the RF module 260 to be transmitted to the antenna 210, the low-frequency signals may be transmitted through the low-pass signal path 224 of the first frequency dividing circuit 220, the low-frequency matching circuit 130, and the low-pass signal path 254 of the second frequency dividing circuit 250. When high-frequency signals are received by the antenna 210 or generated by the RF module 260, the high-frequency signals may be transmitted through the high-pass signal path 225 of the first frequency dividing circuit 220, the high-frequency matching circuit 140, and the high-pass signal path 255 of the second frequency dividing circuit 250. That is, in the antenna system 200, the low-frequency signal path is completely independent of the high-frequency signal path. With such a design, the signal paths of different frequency bands or sub-ranges are separate, and they do not tend to interfere with each other. Accordingly, the harmonic interference in the antenna system 200 can be effectively eliminated. In alternative embodiments, the low-frequency matching circuit 130 may be interchangeable with the high-frequency matching circuit 140.

Figure 4:
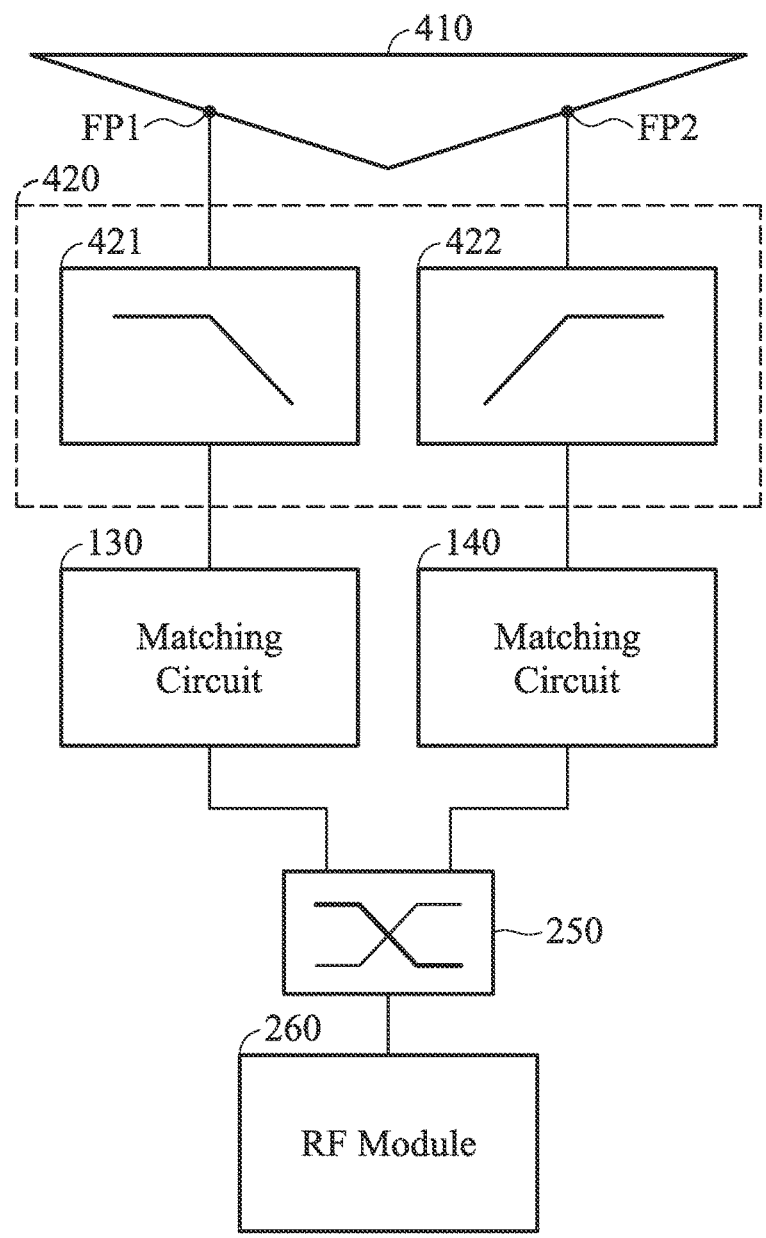
FIG. 4 is a diagram of an antenna system according to an embodiment of the invention.

FIG. 4 is a diagram of an antenna system 400 according to an embodiment of the invention. FIG. 4 is similar to FIG. 2. In the embodiment of FIG. 4, the first frequency dividing circuit 420 of the antenna system 400 includes a first filter 421 and a second filter 422, and the second frequency dividing circuit 250 of the antenna system 400 is a diplexer (as shown in FIG. 3B). The first filter 421 is a low-pass filter, and the second filter 422 is a high-pass filter. The matching circuit 130 is coupled through the first filter 421 to a first feeding point FP1 on the antenna 410. The matching circuit 140 is coupled through the second filter 422 to a second feeding point FP2 on the antenna 410. The first feeding point FP1 and the second feeding point FP2 may be at different positions on the antenna 410. In the embodiment of FIG. 4, the matching circuit 130 is configured to process low-frequency signals, and the matching circuit 140 is configured to process high-frequency signals. When low-frequency signals are received by the antenna 410 to be provided to the RF module 260 or generated by an RF module 260 to be transmitted by the antenna 410, the low-frequency signals may be transmitted through the first filter 421, the low-frequency matching circuit 130, and the low-pass signal path 254 of the second frequency dividing circuit 250. When high-frequency signals are received by the antenna 410 or generated by the RF module 260, the high-frequency signals may be transmitted through the second filter 422, the high-frequency matching circuit 140, and the high-pass signal path 255 of the second frequency dividing circuit 250. That is, in the antenna system 400, the low-frequency signal path is completely independent of the high-frequency signal path. With such a design, the signal paths of different frequency bands or sub-ranges are separate, and they do not tend to interfere with each other. Accordingly, the harmonic interference in the antenna system 400 is effectively eliminated. In alternative embodiments, the first filter 421 may be interchangeable with the second filter 422, and the matching circuit 130 may be interchangeable with the matching circuit 140.

Figure 5:
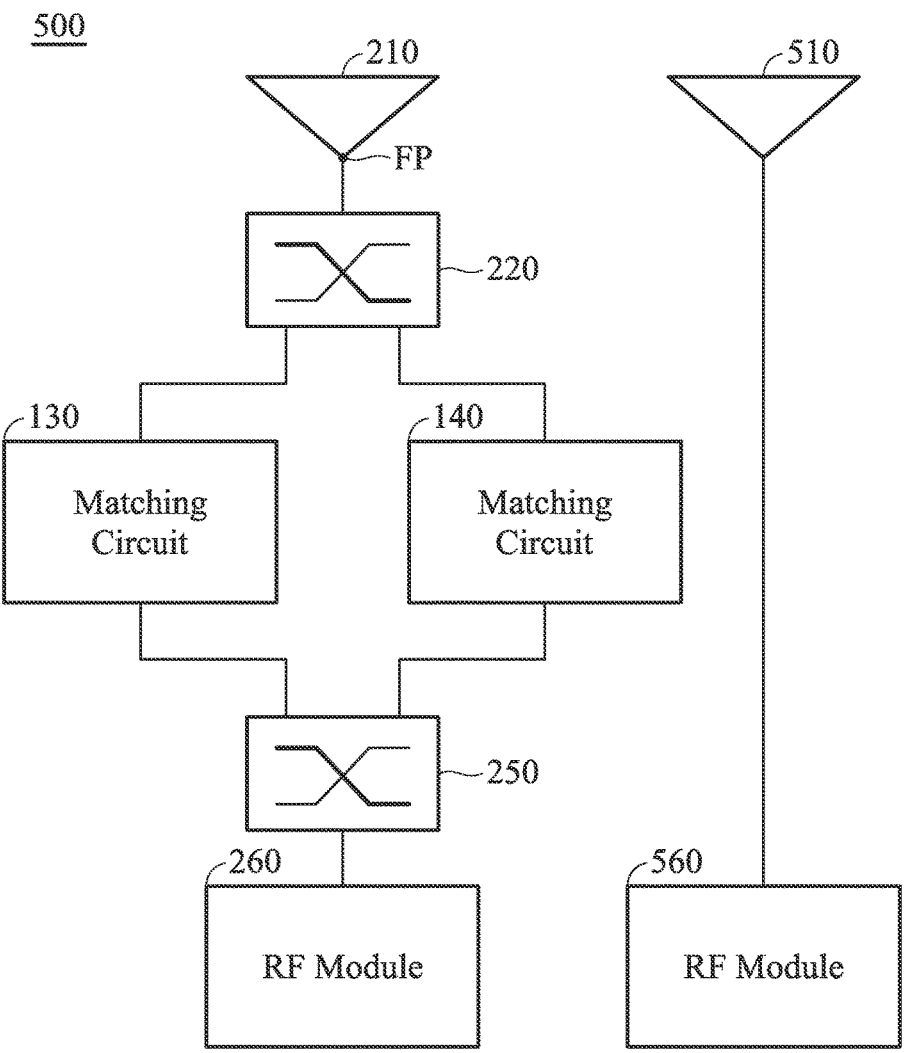
FIG. 5 is a diagram of an antenna system according to an embodiment of the invention.

FIG. 5 is a diagram of an antenna system 500 according to an embodiment of the invention. FIG. 5 is similar to FIG. 2. In the embodiment of FIG. 5, the antenna system 500 further includes a second antenna 510 and a second RF module 560. The second RF module 560 may be directly coupled to a single feeding point on the second antenna 510. A combination of the first antenna 210 and the second antenna 510 can process wideband signals. For example, a low-frequency signal path may be formed by the low-pass signal path 224 of the first frequency dividing circuit (diplexer) 220, the matching circuit 130, and the low-pass signal path 254 of the second frequency dividing circuit (diplexer) 250. A medium-frequency signal path may be formed by the high-pass signal path 225 of the first frequency dividing circuit (diplexer) 220, the matching circuit 140, and the high-pass signal path 255 of the second frequency dividing circuit (diplexer) 250. A high-frequency signal path may be formed by a coupling path between the second antenna 510 and the second RF module 560. In alternative embodiments, the above low/medium/high-frequency signal paths may be interchangeable with each other. It is noted that the RF modules 260 and 560 can be separate modules or integrated into a single device/module. Moreover, in alternative embodiments, one RF module can be used, with separate signal paths coupled (through the frequency selection element) to the antenna.

Figure 6:
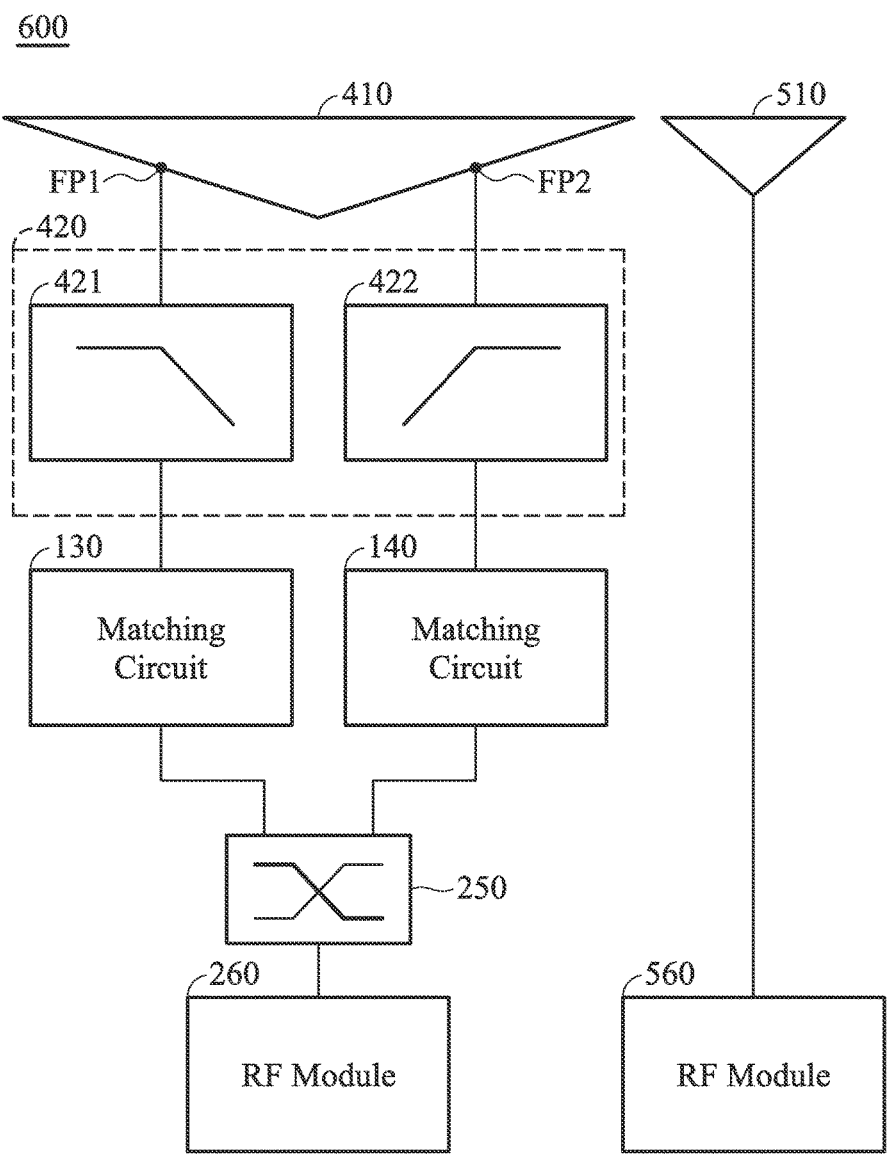
FIG. 6 is a diagram of an antenna system according to an embodiment of the invention.

FIG. 6 is a diagram of an antenna system 600 according to an embodiment of the invention. FIG. 6 is similar to FIG. 4. In the embodiment of FIG. 6, the antenna system 600 further includes a second antenna 510 and a second RF module 560. The second RF module 560 may be directly coupled to a single feeding point on the second antenna 510. A combination of the first antenna 410 and the second antenna 510 can process wideband signals. For example, a low-frequency signal path may be formed by the first filter 421, the matching circuit 130, and the low-pass signal path 254 of the second frequency dividing circuit (diplexer) 250. A medium-frequency signal path may be formed by the second filter 422, the matching circuit 140, and the high-pass signal path 255 of the second frequency dividing circuit (diplexer) 250. A high-frequency signal path may be formed by a coupling path between the second antenna 510 and the second RF module 560. In alternative embodiments, the above low/medium/high-frequency signal paths may be interchangeable with each other. It is noted that the RF modules 260 and 560 can be separate modules or integrated into a single device/module. Moreover, in some embodiments, one RF module can be implemented with separate signal paths respectively coupled (directly or through the frequency selection element) to different antennas.

Figure 7:
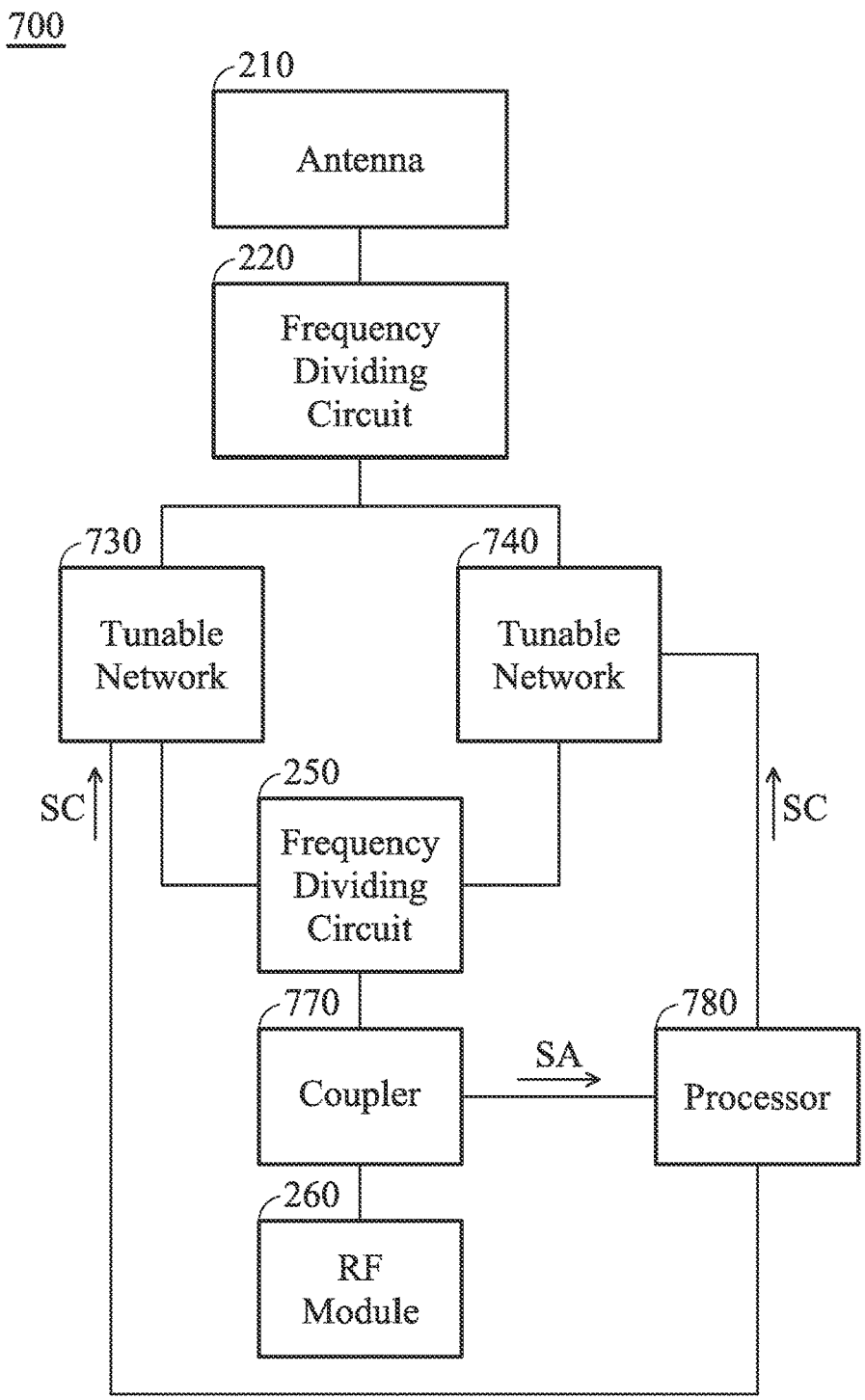
FIG. 7 is a diagram of an antenna system according to an embodiment of the invention.

FIG. 7 is a diagram of an antenna system 700 according to an embodiment of the invention. FIG. 7 is similar to FIG. 2. In the embodiment of FIG. 7, the antenna system 700 further includes a coupler 770 and a processor 780, and the matching circuits of the antenna system 700 are a plurality of tunable networks 730 and 740, which have variable impedance values. The coupler 770 is coupled between the second frequency dividing circuit 250 and the RF module 260, and it provides communication information SA from the antenna 210 to the processor 780. The communication information SA may include return loss or RSSI (Received Signal Strength Indicator) of the antenna 210. The coupler 770 may be disposed at any position of the RF (Radio Frequency) path of the antenna system 700. For example, the coupler 770 may be positioned on the antenna 210, or on a frame of a mobile phone. The processor 780 receives the communication information SA directly or indirectly from the antenna 210, and generates at least one control signal SC according to the communication information SA. The respective impedance values of the tunable networks 730 and 740 (matching circuits) are adjusted according to the control signal SC. With such a design, the antenna system 700 can automatically fine tune itself using the feedback mechanism.

Figure 8:
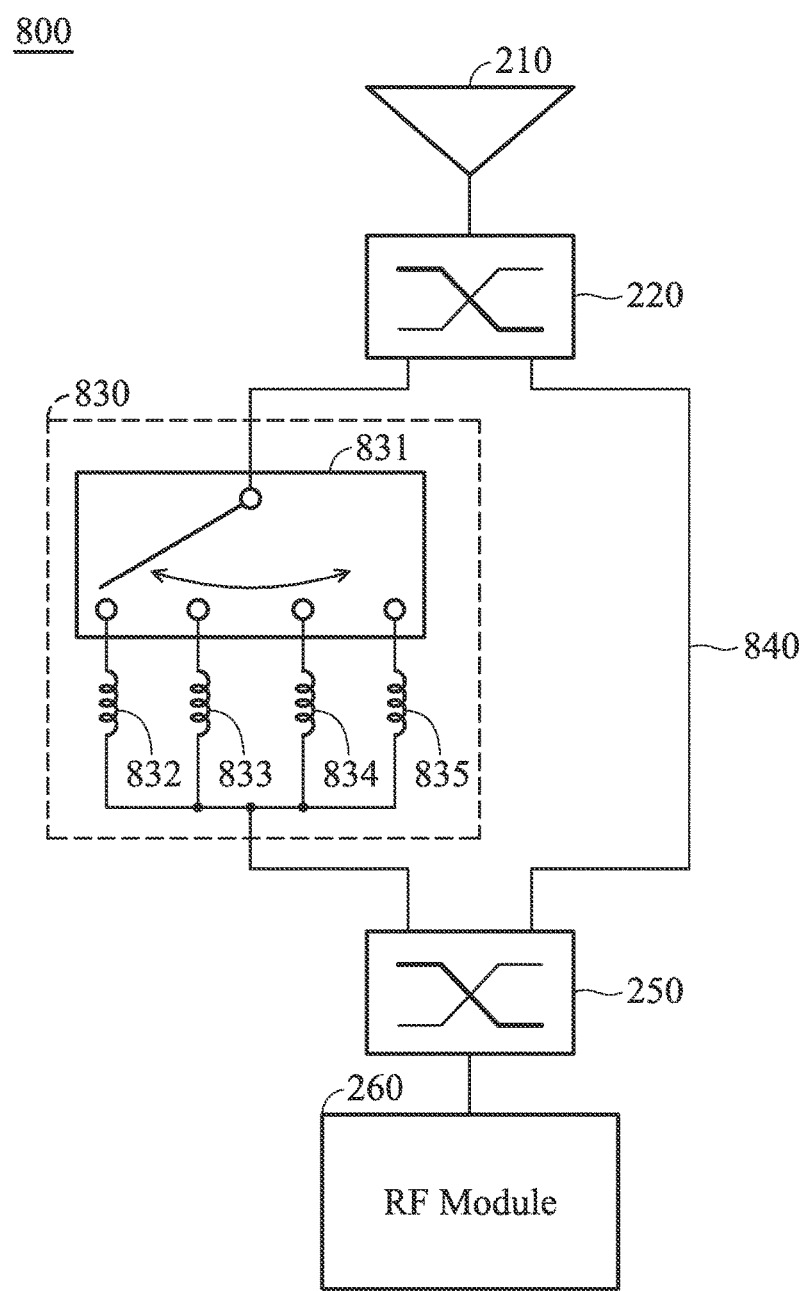
FIG. 8 is a diagram of an antenna system according to an embodiment of the invention.

FIG. 8 is a diagram of an antenna system 800 according to an embodiment of the invention. FIG. 8 is similar to FIG. 2. In the embodiment of FIG. 8, the matching circuit 830 of the antenna system 800 includes a switch element 831 and a plurality of inductors 832 to 835, and the matching circuit 840 of the antenna system 800 is a short-circuited path. The matching circuit 830 is configured to process low-frequency signals, and the matching circuit 840 is configured to process medium/high-frequency signals. The inductors 832 to 835 may have different inductances. The switch element 831 can switch between the inductors 832 to 835, such that the matching circuit 830 can provide a variety of impedance values for the low-frequency signal path. On the other hand, the impedance value of the medium/high-frequency signal paths is constant. In alternative embodiments, the above low/medium/high-frequency signal paths may be interchangeable with each other.

Figure 9A:
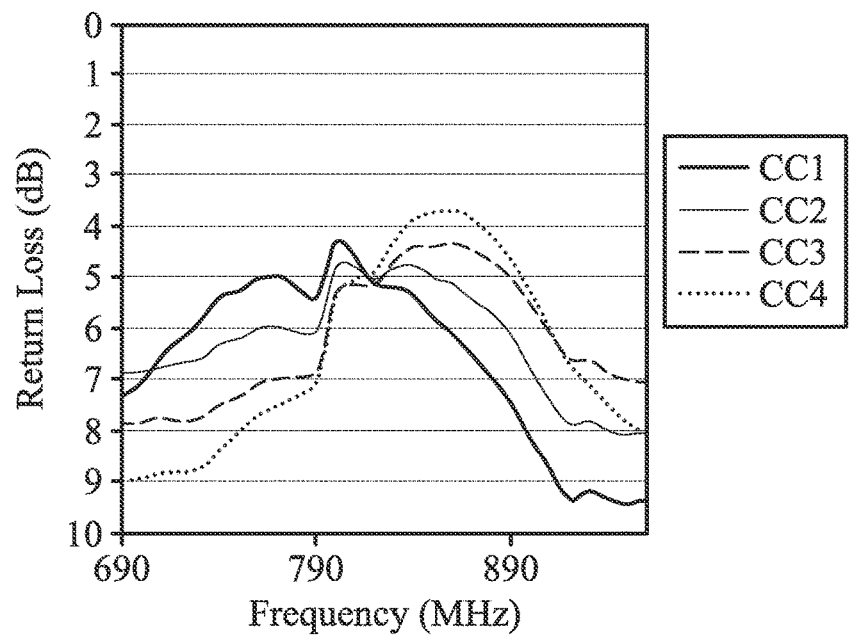
FIG. 9A is diagram of return loss of an antenna system operating in a low-frequency sub-range according to an embodiment of the invention.
Figure 9B:
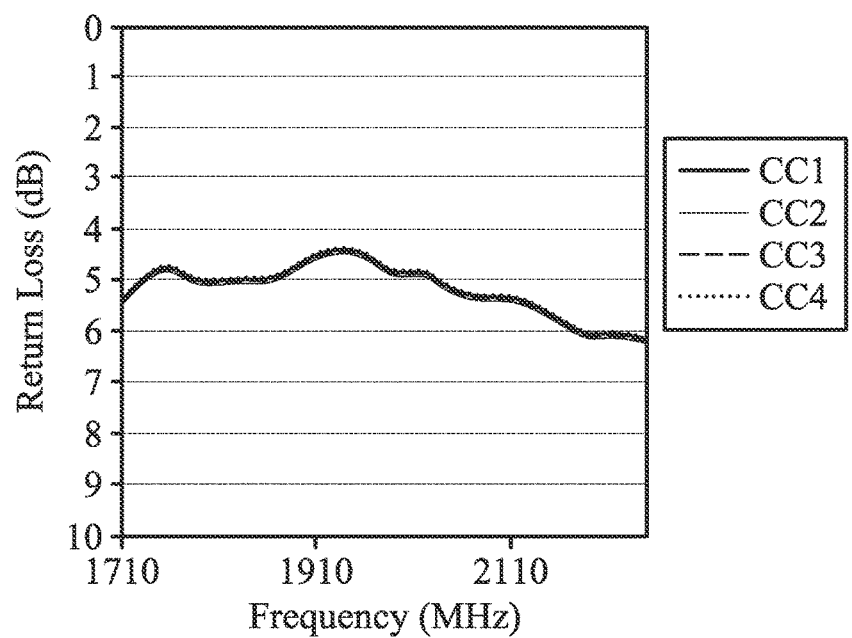
FIG. 9B is diagram of return loss of an antenna system operating in a medium-frequency sub-range according to an embodiment of the invention.
Figure 9C:
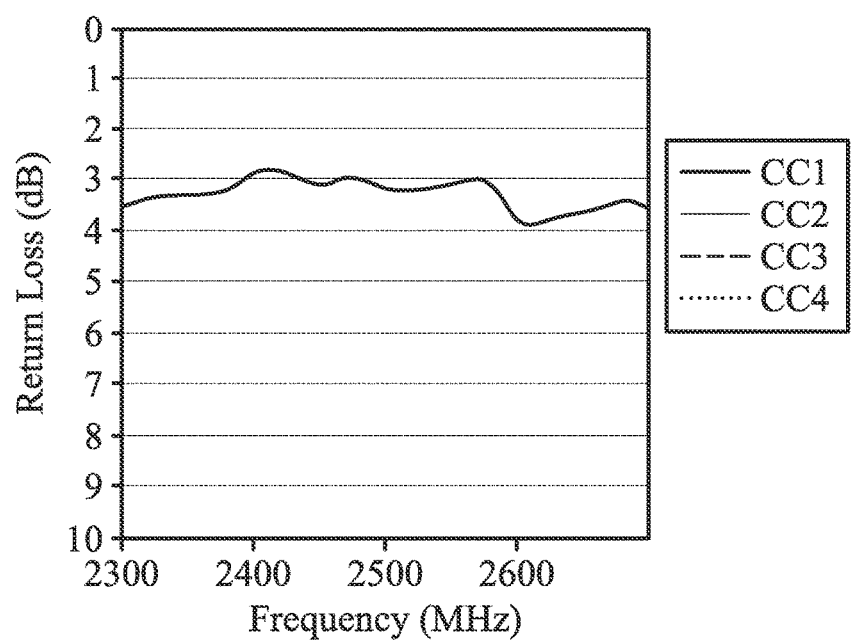
FIG. 9C is diagram of return loss of an antenna system operating in a high-frequency sub-range according to an embodiment of the invention.

FIG. 9A is diagram of return loss of the antenna system 800 operating in a low-frequency sub-range according to an embodiment of the invention. FIG. 9B is diagram of return loss of the antenna system 800 operating in a medium-sub-range according to an embodiment of the invention. FIG. 9C is diagram of return loss of the antenna system 800 operating in a high-sub-range according to an embodiment of the invention. Please refer to FIGS. 9A to 9C together. The horizontal axis represents operation frequency (MHz) of the antenna system 800, and the vertical axis represents the return loss (dB) of the antenna system 800. The curves CC1 to CC4 represent different operating states of the matching circuit 830. For example, when the switch element 831 switches to the inductors 832 to 835, the corresponding return loss of the antenna system 800 may be displayed as the curves CC1 to CC4, respectively. In the embodiment of FIG. 8, the first frequency dividing circuit 220 and the second frequency dividing circuit 250 of the antenna system 800 are diplexers for frequency division. With such a design, when the matching circuit 830 performs a switching operation, only the low-frequency signal path is affected, and it has almost no impact on the medium/high-frequency signal paths. According to the measurement of FIGS. 9A to 9C, during the switching operation of the matching circuit 830, the return loss of the antenna system 800 operating in the medium/high-frequency sub-ranges is almost the same, and only the return loss of the antenna system 800 operating in the low-frequency sub-range is changed accordingly. Since the signal paths of different frequency sub-ranges or components do not tend to negatively affect each other, the harmonic interference in the antenna system 800 can be significantly improved.

The above matching circuit (tunable network) (130, 140, 730, 740, 830, or 840) may be implemented with a variety of circuit structures. Please refer to the following embodiments. It should be understood that these embodiments are just exemplary, rather than limitations of the invention.

Figure 10A:
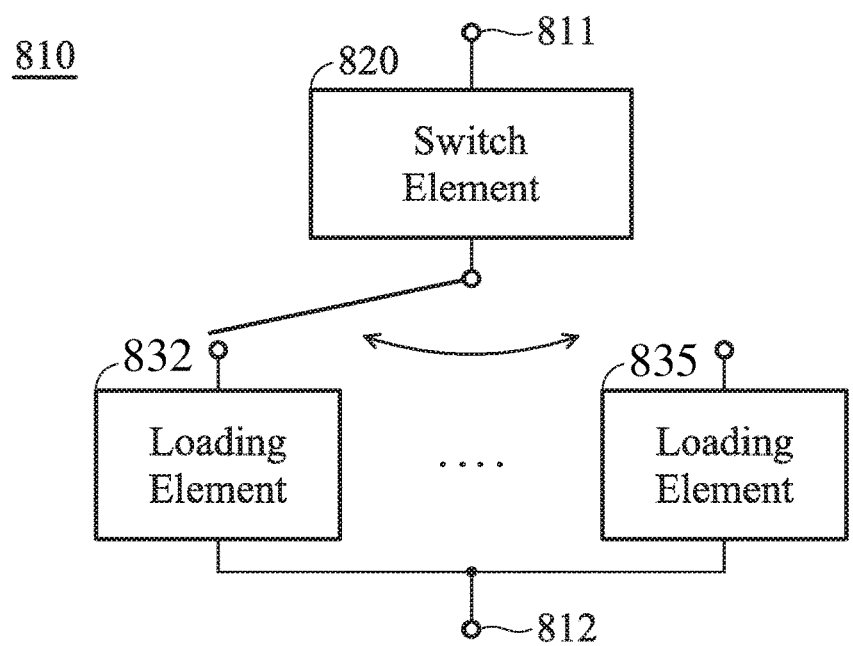
FIG. 10A is a diagram of a matching circuit according to an embodiment of the invention.

FIG. 10A is a diagram of a matching circuit (tunable network) 810 according to an embodiment of the invention. The matching circuit 810 includes a first terminal 811, a second terminal 812, a plurality of loading elements 831 to 832, and a switch element 820. The first terminal 811 of the matching circuit 810 is coupled to the first frequency dividing circuit. The second terminal 812 of the matching circuit 810 is coupled to the second frequency dividing circuit. The loading elements 831 to 832 are coupled to one of the first terminal 811 and the second terminal 812, and they have different impedance values. The switch element 820 is coupled to the other one of the first terminal 811 and the second terminal 812, and it switches between the loading elements 831 to 832. The switch element 820 has a first terminal coupled to the first frequency dividing circuit or the second frequency dividing circuit, and a second terminal switchably coupled to one of the loading elements 831 to 832. At least one of the loading elements 831 to 832 includes one or more inductors, one or more variable capacitors, one or more fixed capacitors, or a combination thereof. In alternative embodiments, the switch element 820 and the loading elements 831-832 can exchange their locations.

Figure 10B:
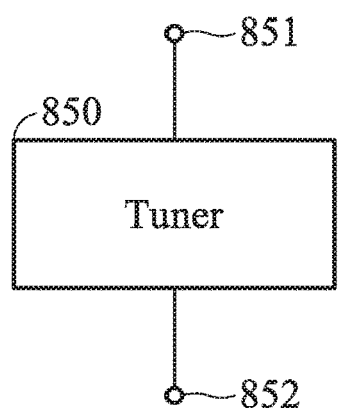
FIG. 10B is a diagram of a matching circuit according to an embodiment of the invention.

FIG. 10B is a diagram of a matching circuit (tunable network) 850 according to an embodiment of the invention. In the embodiment of FIG. 10B, the matching circuit 850 includes a first terminal 851, a second terminal 852, and a tuner 860. The first terminal 851 of the matching circuit 850 is coupled to the first frequency dividing circuit. The second terminal 852 of the matching circuit 850 is coupled to the second frequency dividing circuit. The tuner 860 is coupled between the first terminal 851 and the second terminal 852, and it is configured to generate a variety of impedance values.

Figure 11:
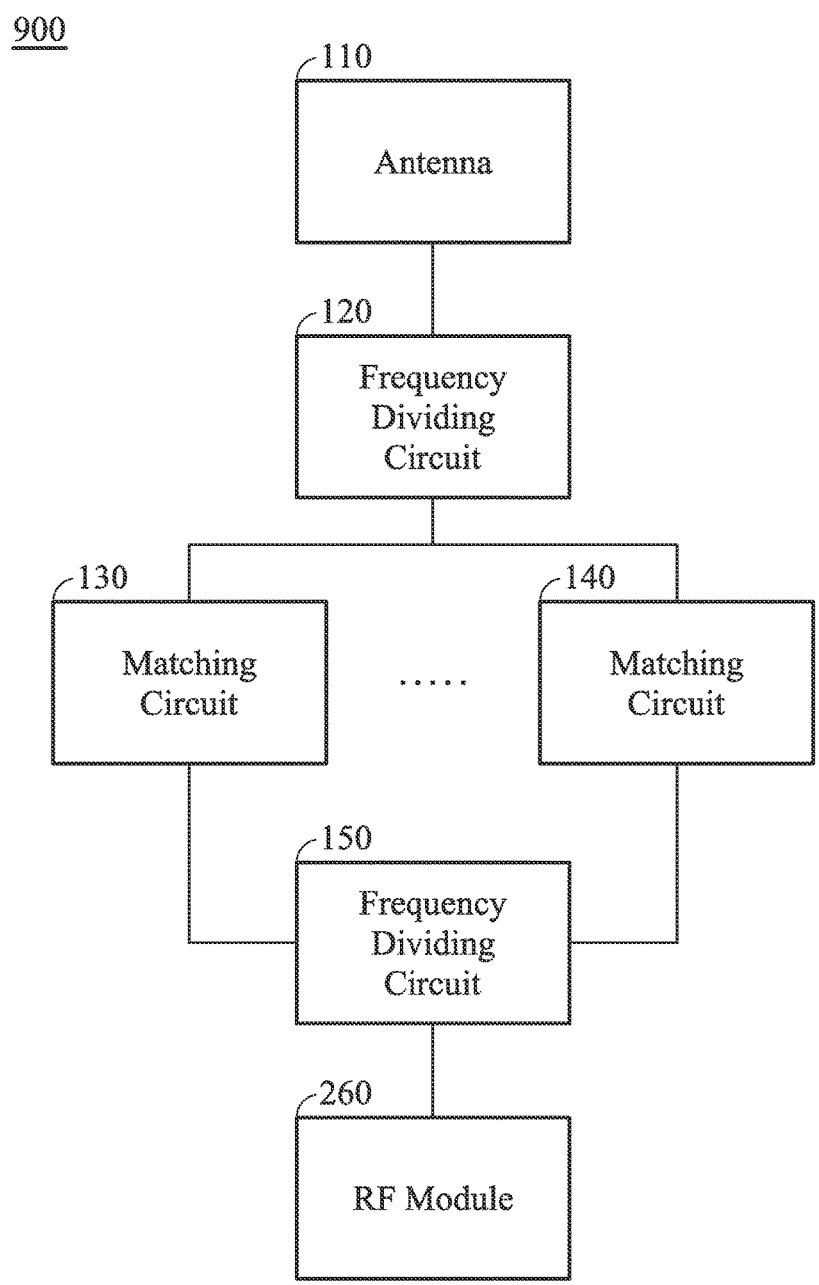
FIG. 11 is a diagram of an electronic device according to an embodiment of the invention.

FIG. 11 is a diagram of an electronic device 900 according to an embodiment of the invention. In the embodiment of FIG. 11, the electronic device 900 includes an antenna 110, a first frequency dividing circuit 120, a plurality of matching circuits 130 and 140, a second frequency dividing circuit 150, and an RF module 260. The first frequency dividing circuit 120 is coupled to the antenna 110. The matching circuits 130 and 140 are coupled to the first frequency dividing circuit 120. The second frequency dividing circuit 150 is coupled to the matching circuits 130 and 140. The RF (Radio Frequency) module 260 is coupled to the second frequency dividing circuit 150. The matching circuits 130 and 140 are configured to process different frequency signals, respectively. It should be understood that all features of the antenna systems of the embodiments FIGS. 1 to 10 may be applied to the electronic device 900 of FIG. 11.

Figure 12:
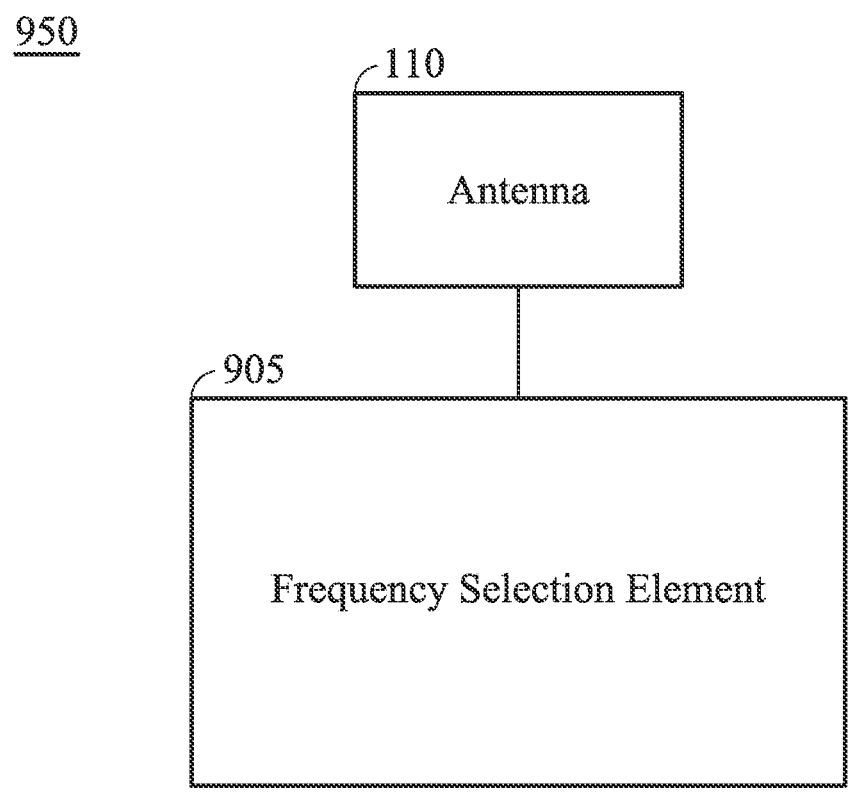
FIG. 12 is a diagram of an antenna system according to an embodiment of the invention.

FIG. 12 is a diagram of an antenna system 950 according to an embodiment of the invention. In the embodiment of FIG. 12, the antenna system 950 includes an antenna 110 and a frequency selection element 905. When the frequency selection element 905 receives a first frequency range from the antenna 110, the frequency selection element 905 divides the first frequency range into a plurality of first frequency sub-ranges, passes at least one of the first frequency sub-sub-ranges through at least one of a plurality of first signal paths, respectively, tunes the at least one first frequency sub-range, and outputs the at least one first frequency sub-range to a RF module (not shown). When the frequency selection element 905 receives a second frequency range from the RF module, the frequency selection element 905 divides the second frequency range into a plurality of second frequency sub-ranges, passes at least one of the second frequency sub-ranges through at least one of a plurality of second signal paths, respectively, tunes the at least one second frequency sub-range, and outputs the at least one second frequency sub-range to the antenna 110. It should be understood that all features of the antenna systems of the embodiments FIGS. 1 to 10 may be applied to the antenna system 950 of FIG. 12, which, however, is not limited thereto. For example, the frequency selection element 905 may include one or more components within the frequency selection element 105 in FIG. 1, or corresponding elements in FIGS. 2-8, 10A-10B, and 11.

It is noted that although antenna and the frequency selection element and components thereof and the RF module(s) are illustrated as different blocks, in implementation, they can disposed separately as different circuits, or two or more blocks can be partly or wholly integrated with each other. For example, part of the frequency selection element, such as the first frequency dividing circuit 120/220/420 can be integrated in to the antenna 110/210/410. Alternatively or additionally, part of the frequency selection element, such as the first frequency dividing circuit 150/250 can be integrated in to the RF module 260.

The embodiments of the disclosure propose a novel antenna system with frequency dividing circuits. Each frequency dividing circuit may be implemented with a low-pass filter, a high-pass filter, a band-pass filter, a diplexer, duplexer, tri-plexer, quad-plexer, or a combination thereof. With such a design, low/medium/high-frequency components do not tend to negatively affect each other, and the harmonic interference in the antenna system can be effectively eliminated. In comparison with the conventional design, the embodiments of the disclosure may provide at least one of the following advantages: (1) widening the bandwidth of an antenna system for carrier aggregation, (2) suppressing the harmonic interference in the antenna system, (3) simplifying the structure of the control circuits of the antenna system, and (4) reducing the manufacturing cost of the antenna system.

The above embodiments are just exemplary, rather than limitations of the invention. It should be understood that the antenna system is not limited to the configuration of FIGS. 1 to 12. The invention may merely include any one or more features of any one or more embodiments of FIGS. 1 to 12. In other words, not all of the features shown in the figures should be implemented in the antenna system of the invention.

The above terms "at least one" or "one or more" mean any positive integer which is greater than one or is equal to one. The number of elements in FIGS. 1 to 12 is not a limitation of the invention. For example, in the embodiments of FIG. 1, although there are exactly two matching circuits 130 and 140 displayed in the figure, it should be understood that any positive number of matching circuits, such as 2, 3, 4, 5, or more, may be used and coupled between the first frequency dividing circuit 120 and the second frequency dividing circuit 150. For example, in the embodiments of FIG. 8, although there are exactly four inductors 832 to 835 displayed in the figure, it should be understood that any positive number of inductors, such as 2, 3, 4, 5, or more, may be used for providing different inductances.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An antenna system, comprising:
a first antenna;
a first frequency dividing circuit, coupled to the first antenna;
a plurality of matching circuits, coupled to the first frequency dividing circuit; and
a second frequency dividing circuit, coupled to the matching circuits;
wherein the matching circuits are configured to process different frequency signals, respectively;
wherein when the first frequency dividing circuit receives a frequency range from the first antenna, the first frequency dividing circuit divides the frequency range into a plurality of frequency sub-ranges, and outputs at least two of the frequency sub-ranges respectively to the matching circuits;
wherein at least one of the matching circuits comprises:
a first terminal, coupled to the first frequency dividing circuit;
a second terminal, coupled to the second frequency dividing circuit;
a plurality of loading elements, coupled to one of the first terminal and the second terminal, and having different impedances; and
a switch element, coupled to the other one of the first terminal and the second terminal, and switching between the loading elements.

2. The antenna system as claimed in claim 1, wherein when the first frequency dividing circuit receives one or more frequency sub-ranges respectively from one or more of the matching circuits, the first frequency dividing circuit outputs the one or more received frequency sub-ranges to the first antenna.

3. The antenna system as claimed in claim 1, wherein the first frequency dividing circuit comprises:
a first port, coupled to the first antenna;
a plurality of second ports, coupled to the matching circuits, respectively; and
a plurality of signal paths, coupled between the first port and the second ports, and configured to pass a plurality of frequency sub-ranges from the first port to the second ports respectively, or respectively from the second ports to the first port.

4. The antenna system as claimed in claim 1, wherein when the second frequency dividing circuit receives a frequency range from a RF (Radio Frequency) module, the second frequency dividing circuit divides the frequency range into a plurality of frequency sub-ranges, and outputs at least two of the frequency sub-ranges respectively to the matching circuits.

5. The antenna system as claimed in claim 4, wherein when the second frequency dividing circuit receives one or more frequency sub-ranges from one or more of the matching circuits, the second frequency dividing circuit outputs at least one of the one or more received frequency sub-ranges to the RF module.

6. The antenna system as claimed in claim 4, wherein a respective range of at least one of the frequency sub-ranges output by the second frequency dividing circuit is dynamically changed.

7. The antenna system as claimed in claim 1, wherein the second frequency dividing circuit comprises:
a first port, coupled to a RF module;
a plurality of second ports, coupled to the matching circuits, respectively; and
a plurality of signal paths, coupled between the first port and the second ports, and configured to pass a plurality of frequency sub-ranges from the first port to the second ports respectively, or respectively from the second ports to the first port.

8. The antenna system as claimed in claim 1, further comprising:
a first RF (Radio Frequency) module, coupled to the second frequency dividing circuit.

9. The antenna system as claimed in claim 8, further comprising:
a second antenna; and
a second RF (Radio Frequency) module, coupled to a single feeding point on the second antenna.

10. The antenna system as claimed in claim 9, wherein each of the matching circuits comprises a respective tunable network with a respective impedance value.

11. The antenna system as claimed in claim 10, further comprising:
a coupler, coupled between the second frequency dividing circuit and the first RF module; and
a processor, receiving communication information through the coupler from the first antenna, and generating a control signal according to the communication information;
wherein respective impedance values of the matching circuits are adjusted according to the control signal.

12. The antenna system as claimed in claim 8, wherein the second frequency dividing circuit has a first frequency terminal coupled to a first matching circuit of the matching circuits, a second frequency terminal coupled to a second matching circuit of the matching circuits, and a combined frequency terminal coupled to the first RF module.

13. The antenna system as claimed in claim 12, wherein the second frequency dividing circuit comprises a low-pass signal path and a high-pass signal path, the low-pass signal path is coupled between the first frequency terminal and the combined frequency terminal of the second frequency dividing circuit, and the high-pass signal path is coupled between the second frequency terminal and the combined frequency terminal of the second frequency dividing circuit.

14. The antenna system as claimed in claim 1, wherein the first frequency dividing circuit is a diplexer.

15. The antenna system as claimed in claim 14, wherein the diplexer has a first frequency terminal coupled to a first matching circuit of the matching circuits, a second frequency terminal coupled to a second matching circuit of the matching circuits, and a combined frequency terminal coupled to the first antenna.

16. The antenna system as claimed in claim 15, wherein the diplexer comprises a low-pass signal path and a high-pass signal path, the low-pass signal path is coupled between the first frequency terminal and the combined frequency terminal of the diplexer, and the high-pass signal path is coupled between the second frequency terminal and the combined frequency terminal of the diplexer.

17. The antenna system as claimed in claim 15, wherein the combined frequency terminal of the diplexer is coupled to a single feeding point on the first antenna.

18. The antenna system as claimed in claim 1, wherein the first frequency dividing circuit comprises a first filter and a second filter.

19. The antenna system as claimed in claim 18, wherein a first matching circuit of the matching circuit is coupled through the first filter to a first feeding point on the first antenna, and a second matching circuit of the matching circuits is coupled through the second filter to a second feeding point on the first antenna.

20. The antenna system as claimed in claim 18, wherein the first filter is a low-pass filter, and the second filter is a high-pass filter.

21. The antenna system as claimed in claim 1, wherein at least one of the first frequency dividing circuit and the second frequency dividing circuit is a passive element.

22. The antenna system as claimed in claim 1, wherein at least one of the first frequency dividing circuit and the second frequency dividing circuit is an active element.

23. The antenna system as claimed in claim 1, wherein a respective range of at least one of the frequency sub-ranges output by the first frequency dividing circuit is dynamically changed.

24. The antenna system as claimed in claim 1, wherein each of the first frequency dividing circuit and the second frequency dividing circuit comprises a low-pass filter, a high-pass filter, a band-pass filter, a diplexer, duplexer, tri-plexer, quad-plexer, or a combination thereof.

25. The antenna system as claimed in claim 1, wherein at least one of the loading elements comprises one or more inductors, one or more variable capacitors, one or more fixed capacitors, or a combination thereof.

26. The communication device as claimed in claim 1, wherein at least one of the matching circuits comprises:
a tuner, coupled between the first frequency dividing circuit and the second frequency dividing circuit, and generating different impedance values.

27. A harmonic suppression element, comprising:
a first frequency dividing circuit;
a first matching circuit, coupled to the first frequency dividing circuit;
a second matching circuit, coupled to the first frequency dividing circuit; and
a second frequency dividing circuit, coupled to the first matching circuit and the second matching circuit;
wherein the first matching circuit and the second matching circuit are configured to process different frequency signals, respectively;
wherein when the first frequency dividing circuit receives a frequency range from an antenna, the first frequency dividing circuit divides the frequency range into a plurality of frequency sub-ranges, and outputs two of the frequency sub-ranges respectively to the first matching circuit and the second matching circuit;
wherein at least one of the first matching circuit and the second matching circuit comprises:
a first terminal, coupled to the first frequency dividing circuit;
a second terminal, coupled to the second frequency dividing circuit;
a plurality of loading elements, coupled to one of the first terminal and the second terminal, and having different impedances; and
a switch element, coupled to the other one of the first terminal and the second terminal, and switching between the loading elements.

28. The harmonic suppression element as claimed in claim 27, wherein the second frequency dividing circuit has a first frequency terminal coupled to the first matching circuit, a second frequency terminal coupled to the second matching circuit, and a combined frequency terminal.

29. The harmonic suppression element as claimed in claim 28, wherein the second frequency dividing circuit comprises a low-pass signal path and a high-pass signal path, the low-pass signal path is coupled between the first frequency terminal and the combined frequency terminal of the second frequency dividing circuit, and the high-pass signal path is coupled between the second frequency terminal and the combined frequency terminal of the second frequency dividing circuit.

30. The harmonic suppression element as claimed in claim 27, wherein the first frequency dividing circuit is a diplexer.

31. The harmonic suppression element as claimed in claim 30, wherein the diplexer has a first frequency terminal coupled to the first matching circuit, a second frequency terminal coupled to the second matching circuit, and a combined frequency terminal.

32. The harmonic suppression element as claimed in claim 31, wherein the diplexer comprises a low-pass signal path and a high-pass signal path, the low-pass signal path is coupled between the first frequency terminal and the combined frequency terminal of the diplexer, and the high-pass signal path is coupled between the second frequency terminal and the combined frequency terminal of the diplexer.

33. The harmonic suppression element as claimed in claim 27, wherein the first frequency dividing circuit comprises a first filter and a second filter.

34. The harmonic suppression element as claimed in claim 33, wherein the first filter is a low-pass filter, and the second filter is a high-pass filter.

35. The harmonic suppression element as claimed in claim 33, wherein the first matching circuit is coupled to the first filter, and the second matching circuit is coupled to the second filter.

36. The harmonic suppression element as claimed in claim 27, wherein the first matching circuit is a first tunable network with a first impedance value, the second matching circuit is a second tunable network with a second impedance value, and the first impedance value and the second impedance value are adjusted according to a control signal.

37. The harmonic suppression element as claimed in claim 27, wherein at least one of the first frequency dividing circuit and the second frequency dividing circuit is a passive element.

38. The harmonic suppression element as claimed in claim 27, wherein at least one of the first frequency dividing circuit and the second frequency dividing circuit is an active element.

39. The harmonic suppression element as claimed in claim 27, wherein each of the first frequency dividing circuit and the second frequency dividing circuit comprises a low-pass filter, a high-pass filter, a band-pass filter, a diplexer, duplexer, tri-plexer, quad-plexer, or a combination thereof.

40. The harmonic suppression element as claimed in claim 27, wherein at least one of the loading elements comprises one or more inductors, one or more variable capacitors, one or more fixed capacitors, or a combination thereof.

41. The harmonic suppression element as claimed in claim 27, wherein at least one of the first matching circuit and the second matching circuit comprises:
a tuner, coupled between the first frequency dividing circuit and the second frequency dividing circuit, and generating different impedance values.

42. An electronic device, comprising:
an antenna;
a first frequency dividing circuit, coupled to the antenna;
a plurality of matching circuits, coupled to the first frequency dividing circuit;
a second frequency dividing circuit, coupled to the matching circuits; and
an RF (Radio Frequency) module, coupled to the second frequency dividing circuit;
wherein the matching circuits are configured to process different frequency signals, respectively;
wherein when the first frequency dividing circuit receives a frequency range from the antenna, the first frequency dividing circuit divides the frequency range into a plurality of frequency sub-ranges, and outputs at least two of the frequency sub-ranges respectively to the matching circuits;
wherein at least one of the matching circuits comprises:
a first terminal, coupled to the first frequency dividing circuit;
a second terminal, coupled to the second frequency dividing circuit;
a plurality of loading elements, coupled to one of the first terminal and the second terminal, and having different impedances; and
a switch element, coupled to the other one of the first terminal and the second terminal, and switching between the loading elements.

* * * * *